(12) United States Patent
Sugi et al.

(10) Patent No.: US 9,013,754 B1
(45) Date of Patent: Apr. 21, 2015

(54) COLOR PROCESSING DEVICE, IMAGE FORMING APPARATUS, AND RECORDING MEDIUM

(71) Applicant: Fuji Xerox Co., Ltd., Tokyo (JP)

(72) Inventors: Shinsuke Sugi, Kanagawa (JP); Kenji Mori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/296,923

(22) Filed: Jun. 5, 2014

(30) Foreign Application Priority Data

Dec. 19, 2013 (JP) .................................. 2013-263083

(51) Int. Cl.
*H04N 1/60* (2006.01)
*G06K 15/02* (2006.01)

(52) U.S. Cl.
CPC .................................. *G06K 15/1878* (2013.01)

(58) Field of Classification Search
None
See application file for complete search history.

(56) References Cited

U.S. PATENT DOCUMENTS

| | | | | |
|---|---|---|---|---|
| 6,215,561 B1 * | 4/2001 | Kakutani | ........................ | 358/1.9 |
| 7,456,999 B2 * | 11/2008 | Hiramatsu | ...................... | 358/1.9 |
| 7,589,864 B2 * | 9/2009 | Teraue | ............................ | 358/1.9 |
| 7,952,763 B2 * | 5/2011 | Borg | .............................. | 358/1.9 |
| 8,335,015 B2 * | 12/2012 | Klassen et al. | ................. | 358/1.9 |
| 8,503,775 B2 * | 8/2013 | Ishii et al. | ...................... | 382/167 |
| 2005/0190388 A1 * | 9/2005 | Kawakami et al. | ............. | 358/1.9 |
| 2005/0225785 A1 * | 10/2005 | Hiramatsu | ...................... | 358/1.9 |
| 2006/0007457 A1 * | 1/2006 | Namikata | ....................... | 358/1.9 |
| 2008/0030786 A1 * | 2/2008 | Rijavec | ......................... | 358/3.23 |
| 2012/0274958 A1 * | 11/2012 | Hoshino | ......................... | 358/1.9 |
| 2013/0100465 A1 * | 4/2013 | Fischer et al. | .................. | 358/1.9 |

FOREIGN PATENT DOCUMENTS

JP A-2006-165864 6/2006
JP A-2011-254234 12/2011

* cited by examiner

*Primary Examiner* — Dung Tran
(74) *Attorney, Agent, or Firm* — Oliff PLC (57) ABSTRACT

A color processing device includes: an association information acquisition section that acquires first association information obtained by associating first color information and first output color information as a target to be output from a color adjustment-subject unit, and second association information obtained by associating the first color information and second output color information for an image actually output from the color adjustment-subject unit; an output section that outputs second color information to the color adjustment-subject unit; an output color information acquisition section that acquires third output color information; a prediction section that predicts the second association information to be newly applied on the basis of the third output color information; and a conversion relationship preparation section that prepares a conversion relationship for performing a color adjustment on the color adjustment-subject unit on the basis of the predicted second association information and the first association information.

8 Claims, 8 Drawing Sheets

TARGET INFORMATION

| C | M | Y | K | L* | a* | b* |
|---|---|---|---|----|----|-----|
| 70 | 100 | 100 | 100 | 12.1 | 2.3 | 6.7 |
| 25 | 0 | 0 | 100 | 82.0 | -6.8 | -12.5 |
| 70 | 0 | 100 | 20 | 54.6 | -35.5 | 43.0 |
| 40 | 100 | 40 | 0 | 36.9 | 49.4 | -1.3 |
| 40 | 0 | 0 | 100 | 12.2 | 9.2 | 0.6 |
| 40 | 0 | 70 | 80 | 17.6 | 23.7 | -8.4 |
| 40 | 100 | 0 | 60 | 52.3 | -10.1 | 28.6 |
| 20 | 100 | 70 | 50 | 65.1 | 0.4 | -1.8 |
| 0 | 100 | 100 | 0 | 23.2 | -2.0 | -13.6 |
| 100 | 0 | 0 | 80 | 21.8 | 27.7 | 17.3 |
| 0 | 0 | 0 | 0 | 68.7 | 6.8 | -15.8 |
| 30 | 30 | 0 | 0 | 39.3 | -44.9 | 14.6 |
| 100 | 40 | 100 | 0 | 48.6 | 11.7 | -28.0 |
| 60 | 60 | 0 | 100 | 17.6 | -6.0 | 7.9 |
| 40 | 0 | 70 | 0 | 66.6 | -17.9 | 9.7 |
| 40 | 0 | 40 | 20 | ... | ... | ... |
| 12 | 0 | 12 | 0 | 85.5 | -4.7 | 2.6 |
| 90 | 60 | 60 | 0 | 37.5 | -16.7 | -7.6 |
| 45 | 90 | 90 | 20 | 39.4 | 35.0 | 21.7 |
| 20 | 100 | 100 | 0 | 36.4 | 48.7 | 28.2 |
| 0 | 20 | 20 | 20 | 46.3 | 70.1 | 3.7 |
| 0 | 100 | 10 | 10 | 53.2 | -15.4 | -22.2 |
| 70 | 20 | 12 | 20 | 73.8 | -1.4 | -2.5 |
| 20 | 12 | 0 | 0 | 45.6 | -12.0 | -39.9 |
| 90 | 45 | 0 | 0 | 88.6 | 4.3 | -1.1 |
| 0 | 7 | 0 | 0 | | | |

BASE DATA

| C | M | Y | K | L* | a* | b* |
|---|---|---|---|----|----|-----|
| 70 | 100 | 100 | 100 | 16.7 | 4.0 | 1.2 |
| 25 | 0 | 0 | 100 | 82.7 | -9.6 | -15.5 |
| 70 | 0 | 100 | 20 | 49.5 | -39.6 | 43.9 |
| 40 | 100 | 40 | 0 | 34.0 | 52.4 | -4.8 |
| 40 | 0 | 0 | 100 | 8.3 | 11.6 | -4.9 |
| 40 | 0 | 70 | 80 | 12.4 | 18.3 | -9.2 |
| 40 | 100 | 0 | 60 | 41.8 | -10.0 | 26.8 |
| 20 | 100 | 70 | 50 | 50.8 | -0.7 | -3.2 |
| 0 | 100 | 100 | 0 | 21.3 | -0.2 | -15.2 |
| 100 | 0 | 0 | 80 | 18.1 | 18.0 | 9.3 |
| 0 | 0 | 0 | 0 | 68.3 | 8.2 | -23.1 |
| 30 | 30 | 0 | 0 | 33.6 | -54.1 | 18.7 |
| 100 | 40 | 100 | 0 | 46.4 | 14.7 | -37.3 |
| 60 | 60 | 0 | 100 | 11.2 | -5.4 | 2.4 |
| 40 | 0 | 70 | 0 | 63.4 | -20.3 | 8.2 |
| 40 | 0 | 40 | 20 | ... | ... | ... |
| 12 | 0 | 12 | 0 | 87.0 | -6.7 | 3.0 |
| 90 | 60 | 60 | 0 | 35.2 | -21.2 | -11.1 |
| 45 | 90 | 90 | 20 | 37.3 | 33.6 | 25.2 |
| 20 | 100 | 100 | 0 | 33.1 | 48.2 | 31.8 |
| 0 | 20 | 20 | 20 | 43.3 | 73.6 | 3.5 |
| 0 | 100 | 10 | 10 | 49.0 | -17.7 | -28.9 |
| 70 | 20 | 12 | 20 | 73.1 | -2.2 | -4.7 |
| 20 | 12 | 0 | 0 | 40.5 | -10.5 | -51.3 |
| 90 | 45 | 0 | 0 | 89.0 | 6.1 | -5.0 |
| 0 | 7 | 0 | 0 | | | |

COLOR PROCESSING DEVICE, IMAGE FORMING APPARATUS, AND RECORDING MEDIUM

CROSS-REFERENCE TO RELATED APPLICATIONS

This application is based on and claims priority under 35 USC 119 from Japanese Patent Application No. 2013-263083 filed Dec. 19, 2013.

BACKGROUND

1. Technical Field

The present invention relates to a color processing device, an image forming apparatus, and a recording medium.

2. Summary

According to an aspect of the present invention, there is provided an color processing device including: an association information acquisition section that acquires first association information obtained by associating first color information in a first color space and first output color information as a target to be output in a second color space when the first color information is input to a color adjustment-subject unit which is subjected to a color adjustment for an image, and second association information obtained by associating the first color information and second output color information in the second color space for an image output when the first color information is input to the color adjustment-subject unit; an output section that outputs second color information in the first color space, which has been reduced in number compared to the first color information used for the second association information, to the color adjustment-subject unit; an output color information acquisition section that acquires third output color information in the second color space output from the color adjustment-subject unit when the second color information is input to the color adjustment-subject unit; a prediction section that predicts the second association information to be newly applied on the basis of the third output color information by predicting the second output color information; and a conversion relationship preparation section that prepares a conversion relationship for performing a color adjustment on the color adjustment-subject unit in the first color space on the basis of the predicted second association information and the first association information.

BRIEF DESCRIPTION OF THE DRAWINGS

An exemplary embodiment of the present invention will be described in detail based on the following figures, wherein:

FIG. 5 illustrates examples of target information and base data stored in an association information storage section;

DETAILED DESCRIPTION

<Overall Configuration of Image Forming Apparatus>

Figure 1:
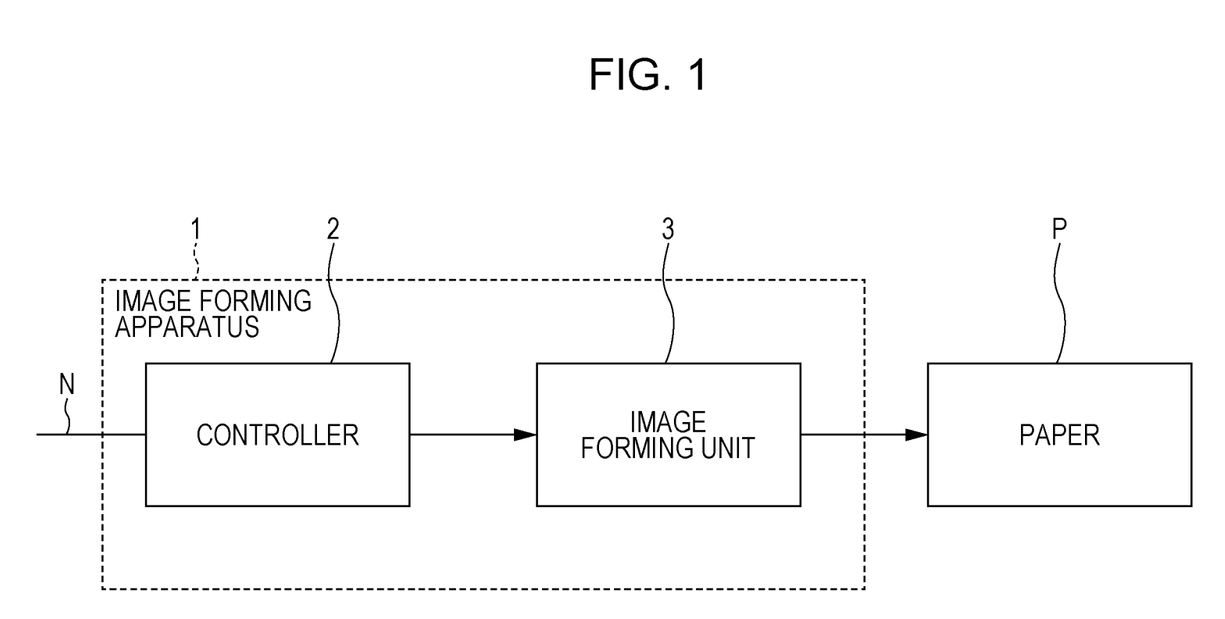
FIG. 1 illustrates an example of the functional configuration of an image forming apparatus according to an exemplary embodiment.

FIG. 1 illustrates an example of the functional configuration of an image forming apparatus 1 according to an exemplary embodiment.

The image forming apparatus 1 includes a controller 2 that controls various sections of the image forming apparatus 1, and an image forming unit 3 that serves as a printing mechanism that forms an image on paper (a recording material or a recording medium) P.

The controller 2 of the image forming apparatus 1 is connected to a network N, and receives print data (image data) from a personal computer (PC) (not illustrated) or the like via the network N. As discussed in detail later, the controller 2 transmits the print data to the image forming unit 3 after performing necessary image processing such as a color adjustment.

In the exemplary embodiment, the image forming unit 3 is an example of a color adjustment-subject unit which is subjected to a color adjustment for an image, and forms an image on the paper P using plural color materials. The image forming unit 3 is a printer, for example. In the exemplary embodiment, the image forming unit 3 is of an electrophotographic printing type in which toner adhering to a photosensitive body is transferred onto the paper P to form an image. However, the image forming unit 3 is not limited thereto, and may be of an inkjet type in which ink is used as the color materials and discharged onto a recording medium to form an image. After printing is performed on the paper P, the image forming unit 3 outputs the paper P to the outside of the image forming apparatus 1 as printed matter.

<Example of Functional Configuration of Controller 2>

Figure 2:
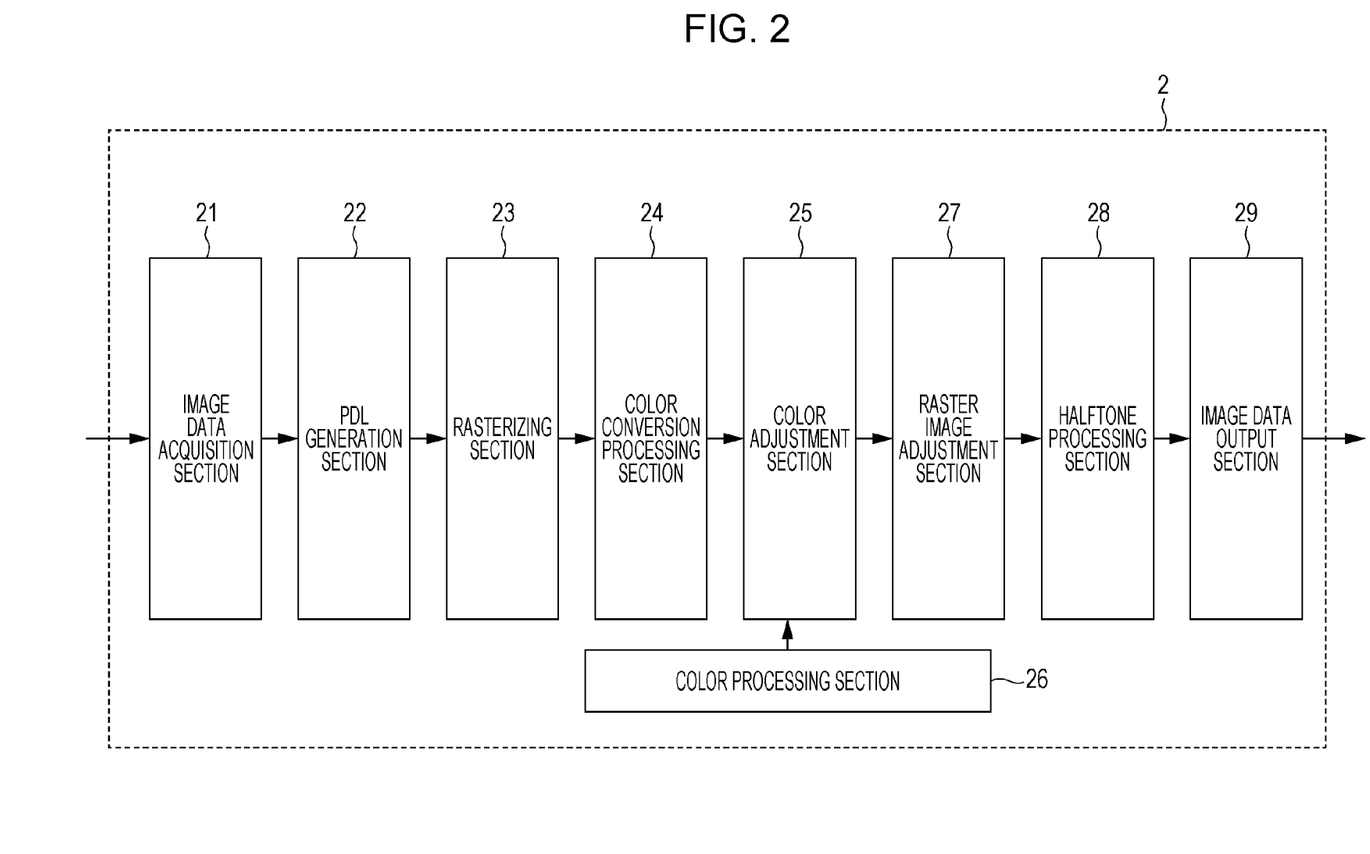
FIG. 2 is a block diagram illustrating a signal processing system of a controller.

FIG. 2 is a block diagram illustrating a signal processing system of the controller 2.

The controller 2 includes an image data acquisition section 21 that acquires print data prepared for the image forming unit 3 to output an image, a page description language (PDL) generation section 21 that receives the print data to convert the print data into a PDL, a rasterizing section 23 that prepares a raster image from the PDL generated by the PDL generation section 22, a color conversion processing section 24 that converts RGB data into YMCK data, a color adjustment section 25 that performs a color adjustment for the YMCK data, a color processing section 26 that prepares a profile for the color adjustment section 25 to perform a color adjustment, a raster image adjustment section 27 that adjusts the raster image which has been subjected to a conversion performed by the color adjustment section 25, a halftone processing section 28 that performs a halftone process, and an image data output section 29 that outputs the print data which have been subjected to a color conversion process to the image forming unit 3.

In the exemplary embodiment, first, the image data acquisition section 21 receives print data from an external PC. The print data are image data that a user who uses the PC desires to print using the image forming apparatus 1.

Then, the print data are sent to the PDL generation section 22. The PDL generation section 22 converts the print data into code data described in the PDL to output the code data.

The rasterizing section 23 converts the code data described in the PDL output from the PDL generation section 22 into raster data for each pixel to prepare a raster image. Then, the rasterizing section 23 outputs the resulting raster data as RGB (red, green, and blue) video data (RGB data). At this time, the rasterizing section 23 outputs the RGB data page by page.

The color processing section 24 converts the RGB data input from the rasterizing section 23 into device-independent XYZ color values, and thereafter converts the color values into YMCK data represented in colors that are reproducible by the image forming apparatus 1 (the colors of toners as color materials: yellow (Y), magenta (M), cyan (C), and black (K)) to output the YMCK data. The YMCK data are composed of Y-color data, M-color data, C-color data, and K-color data separated into each color.

The color adjustment section 25 is an example of a color adjustment unit that performs a color adjustment for the image formed by the image forming unit 3. As discussed in detail later, the color adjustment section 25 performs a color adjustment for the YMCK data such that target colors to be output from the image forming unit 3 in correspondence with the YMCK data are obtained. In this case, the color adjustment is a process in which $Y_{in}M_{in}C_{in}K_{in}$ data into $Y_{out}M_{out}C_{out}K_{out}$ data (($Y_{in}$, $M_{in}$, $C_{in}$, $K_{in}$)→($Y_{out}$, $M_{out}$, $C_{out}$, $K_{out}$)). In the exemplary embodiment, the conversion is performed using a so-called device link profile, by directly converting the $Y_{in}M_{in}C_{in}K_{in}$ data into the $Y_{out}M_{out}C_{out}K_{out}$ data in the same YMCK color space as the $Y_{in}M_{in}C_{in}K_{in}$ data, without converting the $Y_{in}M_{in}C_{in}K_{in}$ data into data in another color space such as the L*a*b* color space.

In the exemplary embodiment, the device link profile is an example of a conversion relationship, and may be prepared as a four-dimensional look-up table (LUT), for example.

The color processing section 26 is an example of a conversion relationship preparation unit (color processing device) that prepares a device link profile to be used for the color adjustment section 25 to perform a color adjustment. In addition, the color processing section 26 stores the device link profile, and the color adjustment section 25 references the device link profile stored in the color processing section 26 to perform a color adjustment.

The raster image adjustment section 27 performs various types of adjustments such as γ conversion, definition processing, and intermediate tone processing on the $Y_{out}M_{out}C_{out}K_{out}$ data input from the color adjustment section 25 such that a good image quality may be obtained by the image forming unit 3.

The halftone processing section 28 performs halftone processing on the print data through a dither mask process in which a dither mask having an arrangement of thresholds determined in advance in the main scanning direction and the sub-scanning direction is used. Consequently, the print data are converted from a multi-value representation into a two-value representation, for example.

The image data output section 29 outputs image data which have been subjected to image processing such as a color conversion process to the image forming unit 3.

Images formed by the image forming unit 3 may be varied in color because of temporal variations, for example. In this case, the colors of the output image do not agree with the target colors any more. Therefore, in order for the colors of the output image to agree with the target colors, it is necessary to update the device link profile used by the color adjustment section 25.

In order to update the device link profile, the device link profile may be prepared anew. To this end, the image forming unit 3 prints color-measurement images (color patches), a color measurement unit or the like performs a color measurement on the color-measurement images, and the device link profile is prepared anew on the basis of color data obtained through the color measurement.

In the case where images formed by the image forming unit 3 are varied in color because of temporal variations or the like, such variations are normally not great. Therefore, it is often sufficient to finely adjust the device link profile. In this case, it is desired to prepare the device link profile anew by a simple method by reducing the number of color-measurement images.

The device link profile may also be corrected by changing lattice points (YMCK data) of the device link profile, for example.

However, such a correction method may not be applied to a case where a color guarantee for an image formed by the image forming unit 3 is desired. The term "color guarantee" refers to a process for ensuring that each of pure colors (single colors such as the Y color, the M color, and the C color) and a process black color is not varied, for example. That is, muddiness is caused when another color is mixed into the $Y_{in}M_{in}C_{in}K_{in}$ data for a pure color after being subjected to a color adjustment, and it is necessary to prepare the device link profile such that such muddiness is not caused.

Specifically, in the case where color data for each color are represented in 8 bits (256 tones) by an integer of 0 to 255, it is necessary to perform a color conversion while holding the values for colors other than the Y color at 0, such as (20, 0, 0, 0)→(15, 0, 0, 0), in order to perform a color guarantee for the Y color when a color conversion ($Y_{in}$, $M_{in}$, $C_{in}$, $K_{in}$)→($Y_{out}$, $M_{out}$, $C_{out}$, $K_{out}$) is performed, for example.

For the process black color, meanwhile, it is necessary to perform a conversion while holding the color data for the K color in order to avoid variations in color tint. For example, the device link profile is prepared such that the color data for the K color are held, such as (20, 20, 20, 100)→(15, 15, 15, 100), when a color conversion ($Y_{in}$, $M_{in}$, $C_{in}$, $K_{in}$)→($Y_{out}$, $M_{out}$, $C_{out}$, $K_{out}$) is performed.

<Example of Functional Configuration of Color Processing Section 26>

Figure 3:
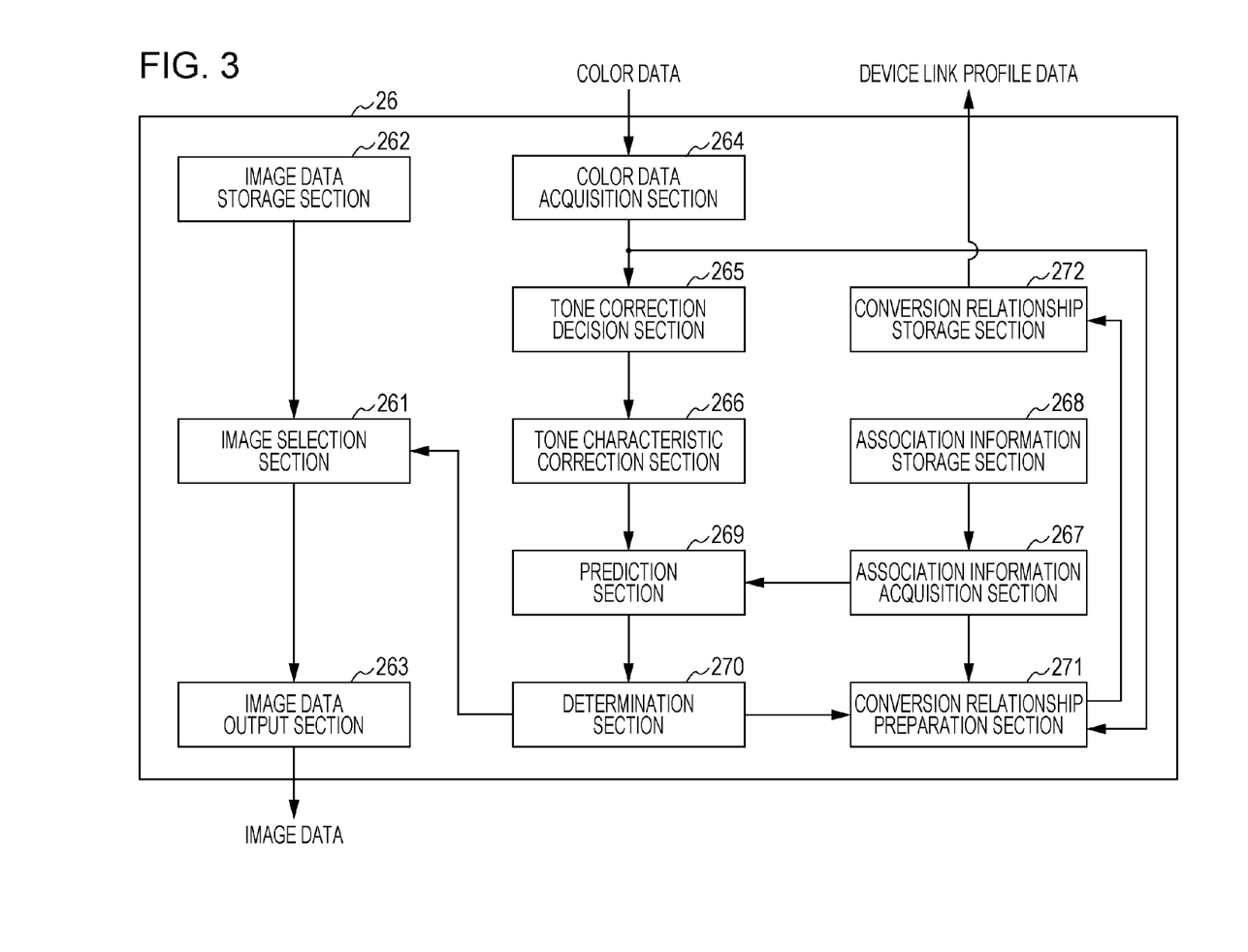
FIG. 3 illustrates an example of the functional configuration of a color processing section.

FIG. 3 illustrates an example of the functional configuration of the color processing section 26.

As illustrated in the drawing, the color processing section 26 according to the exemplary embodiment includes an image selection section 261, an image data storage section 262, an image data output section 263, a color data acquisition section 264, a tone correction decision section 265, a tone characteristic correction section 266, an association information acquisition section 267, an association information storage section 268, a prediction section 269, a determination section 270, a conversion relationship preparation section 271, and a conversion relationship storage section 272.

The image selection section 261 selects color-measurement images. Examples of the color-measurement images used in the exemplary embodiment include color-measurement images for correcting the tone characteristics to be discussed later, and color-measurement images for preparing the device link profile anew. The color-measurement images for correcting the tone characteristics may be images in which the dot area ratio (coverage, Cin) for each of the YMCK colors is set in units of 10% from 0% to 100%, for example. In this case, 11 color-measurement images are selected for each of the YMKC colors.

Meanwhile, the color-measurement images for preparing the device link profile anew may be mixed-color images in which the Cin for each of the YMCK colors is set to various values in the range of 0% to 100%, for example. In the exemplary embodiment, as discussed in detail later, two sets of color-measurement images for preparing the device link profile anew are prepared. In the case where the device link profile is prepared completely anew from the beginning, a full set of color-measurement images is selected. At this time, the number of color-measurement images is 1584, for example. In the case where the device link profile is prepared anew by a simple method, a small set of color-measurement images chosen from the full set of color-measurement images is selected. At this time, the number of color-measurement images is 200, for example.

The image data storage section 262 stores image data for the color-measurement images. In practice, if the color data for each of the YMCK colors have a tone value represented by an integer of 0 to 255, the image data for the color-measurement images are stored by the tone value.

The image data output section 263 outputs image data for the color-measurement images selected by the image selection section 261 to the image forming unit 3.

The image forming unit 3 receives the image data for the color-measurement images, and prints the color-measurement images on the paper P. The colors of the printed color-measurement images are read by a color measurement unit or the like. Then, the color measurement unit or the like transmits color data acquired by reading the color-measurement images to the color processing section 26 of the controller 2. Examples of the color data output from the color measurement unit at this time include $L^*a^*b^*$ data composed of data for various colors such as $L^*$ data, $a^*$ data, and $b^*$ data in the $L^*a^*b^*$ color space.

The color data acquisition section 264 is an example of an output color information acquisition section, and acquires the color data for the color-measurement images transmitted from the color measurement unit as color information.

The tone correction decision section 265 is an example of a correction decision section, and decides whether or not to correct the tone characteristics in accordance with the degree of deviation in tone characteristics. That is, output values for the Cin are obtained from the results of a color measurement performed on the color-measurement images for correcting the tone characteristics, and the tone characteristics for each of the YMCK colors are obtained from such output values. Then, the tone correction decision section 265 decides to correct the tone characteristics in the case where the degree of deviation in tone characteristics exceeds a range determined in advance, and decides not to correct the tone characteristics in the case where the degree of deviation in tone characteristics falls within the range determined in advance.

Figure 4A:
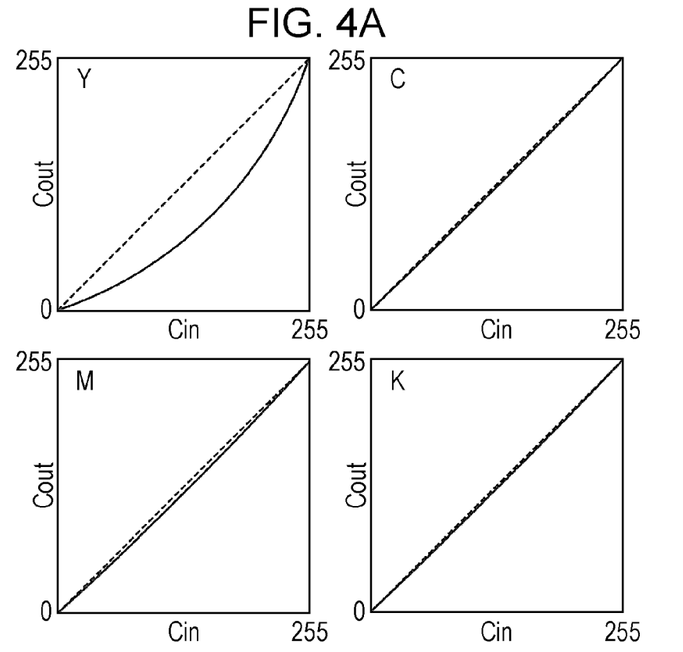
FIGS. 4A and 4B illustrate examples of the tone characteristics for each of Y, M, C, and K colors.
Figure 4B:
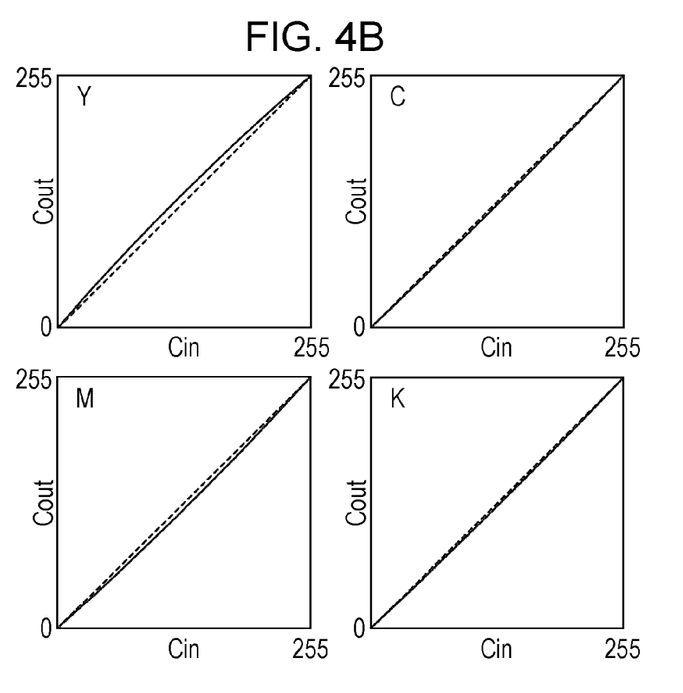

FIGS. 4A and 4B illustrate examples of the tone characteristics for each of the Y, M, C, and K colors. The horizontal axis represents the Cin in a tone value of 0 to 255. The vertical axis represents the output value (Cout) in a tone value of 0 to 255. The dotted lines indicate the desired tone characteristics. In this case, the desired tone characteristics are linear, and represented by a straight line. Meanwhile, the solid lines indicate the actual tone characteristics achieved by the image forming unit 3.

FIG. 4A illustrates a case where the tone characteristics for the C color, the M color, and the K color are good but the tone characteristics for the Y color deviate greatly. Meanwhile, FIG. 4B illustrates a case where the tone characteristics for the C color, the M color, and the K color are good and the tone characteristics for the Y color deviate slightly.

The tone correction decision section 265 may decide to correct the tone characteristics in the case of FIG. 4A in which deviation in tone characteristics for the Y color is great, and not to correct the tone characteristics in the case where of FIG. 4B in which deviation in tone characteristics for the Y color is slight, for example. In this case, correction of the tone characteristics is performed only for the Y color, and not for the C color, the M color, or the K color.

The tone characteristic correction section 266 corrects the tone characteristics for each of the YMCK colors of the image forming unit 3 when the tone correction decision section 265 decides to correct the tone characteristics.

The association information acquisition section 267 acquires first association information and second association information. Examples of the first association information include target information to be discussed in detail later, which is obtained by associating first color information in a first color space and first output color information as the target to be output in a second color space when the first color information is input to the image forming unit 3. In the exemplary embodiment, the phrase "first color information in a first color space" corresponds to the YMCK data in the YMCK color space. In addition, the phrase "first output color information as the target to be output in a second color space when the first color information is input to the image forming unit 3" corresponds to the $L^*a^*b^*$ data as the target to be output in the $L^*a^*b^*$ color space when the YMCK data are input to the image forming unit 3. That is, the first association information is obtained by correlating the target color to be output from the image forming unit 3 with the YMCK data with values determined in advance, and has a correlation relationship (Y, M, C, K)–($L^*$, $a^*$, $b^*$). In the exemplary embodiment, 1584 such correlation relationships are prepared, for example, to constitute the first association information.

Examples of the second association information include base data to be discussed in detail later, which is obtained by associating the first color information and second output color information in a second color space for an image output in the past when the first color information is input to the image forming unit 3. In the exemplary embodiment, the phrase "first color information" corresponds to the YMCK data in the YMCK color space discussed above. In addition, the phrase "second output color information in a second color space for an image output in the past when the first color information is input to the image forming unit 3" corresponds to the $L^*a^*b^*$ data in the $L^*a^*b^*$ color space obtained when a color measurement is performed on an image output to the paper P when the YMCK data are input to the image forming unit 3. That is, the second association information is obtained by correlating the color data for an image actually output from the image forming unit 3 with the YMCK data with values determined in advance, and also has a correlation relationship (Y, M, C, K)–($L^*$, $a^*$, $b^*$). In the exemplary embodiment, the number of such correlation relationships prepared to constitute the second association information is the same as that for the first association information, and is 1584, for example.

The association information storage section 268 stores the target information serving as the first association information and the base data serving as the second association information.

FIG. 5 illustrates examples of the target information and the base data stored in the association information storage section 268.

In both of the target information and the base data, as illustrated in FIG. 5, the YMCK data and the $L^*a^*b^*$ data are associated with each other. Although all are not illustrated in FIG. 5, there are 1584 correlation relationships as discussed above. As illustrated in the drawing, the YMCK data of the target information and the YMCK data of the base data are common to each other, and have the same value. On the other hand, the $L^*a^*b^*$ data of the target information and the $L^*a^*b^*$ data of the base data are normally different from each other. Such differences indicate a difference between the L*a*b* data serving as the target and the L*a*b* data actually output from the image forming unit 3.

The prediction section 269 predicts the base data to be newly applied as discussed in detail later. The prediction is made on the basis of the results of a color measurement performed on the small set of color-measurement images.

The determination section 270 determines whether to prepare the device link profile as the conversion relationship completely anew from the beginning, or to prepare the device link profile by a simple method, as discussed in detail later. In the exemplary embodiment, the device link profile is represented by correlation relationships ((Y, M, C, K)–(Y', M', C', K')) for converting the YMCK data in the YMCK color space into Y'M'C'K' data. The number of such correlation relationships prepared is the same as that for the first association information and the second association information. Therefore, 1584 such correlation relationships are prepared, for example.

The conversion relationship preparation section 271 prepares the device link profile completely anew from the beginning on the basis of color data for the full set of color-measurement images when the determination section 270 decides to prepare the device link profile completely anew from the beginning.

Meanwhile, the conversion relationship preparation section 271 prepares the device link profile anew on the basis of the base data predicted by the prediction section 269 and the target information prepared already when the determination section 270 decides to prepare the device link profile by a simple method. In this case, the device link profile is finely adjusted compared to the device link profile before being prepared anew.

The conversion relationship storage section 272 stores the device link profile prepared by the conversion relationship preparation section 271. The stored device link profile is referenced by the color adjustment section 25 (see FIG. 2) to perform a color conversion (($Y_{in}$, $M_{in}$, $C_{in}$, $K_{in}$)→($Y_{out}$, $M_{out}$, $C_{out}$, $K_{out}$)).

<Operation of Color Processing Section 26>

Next, operation of the color processing section 26 will be described.

Figure 6:
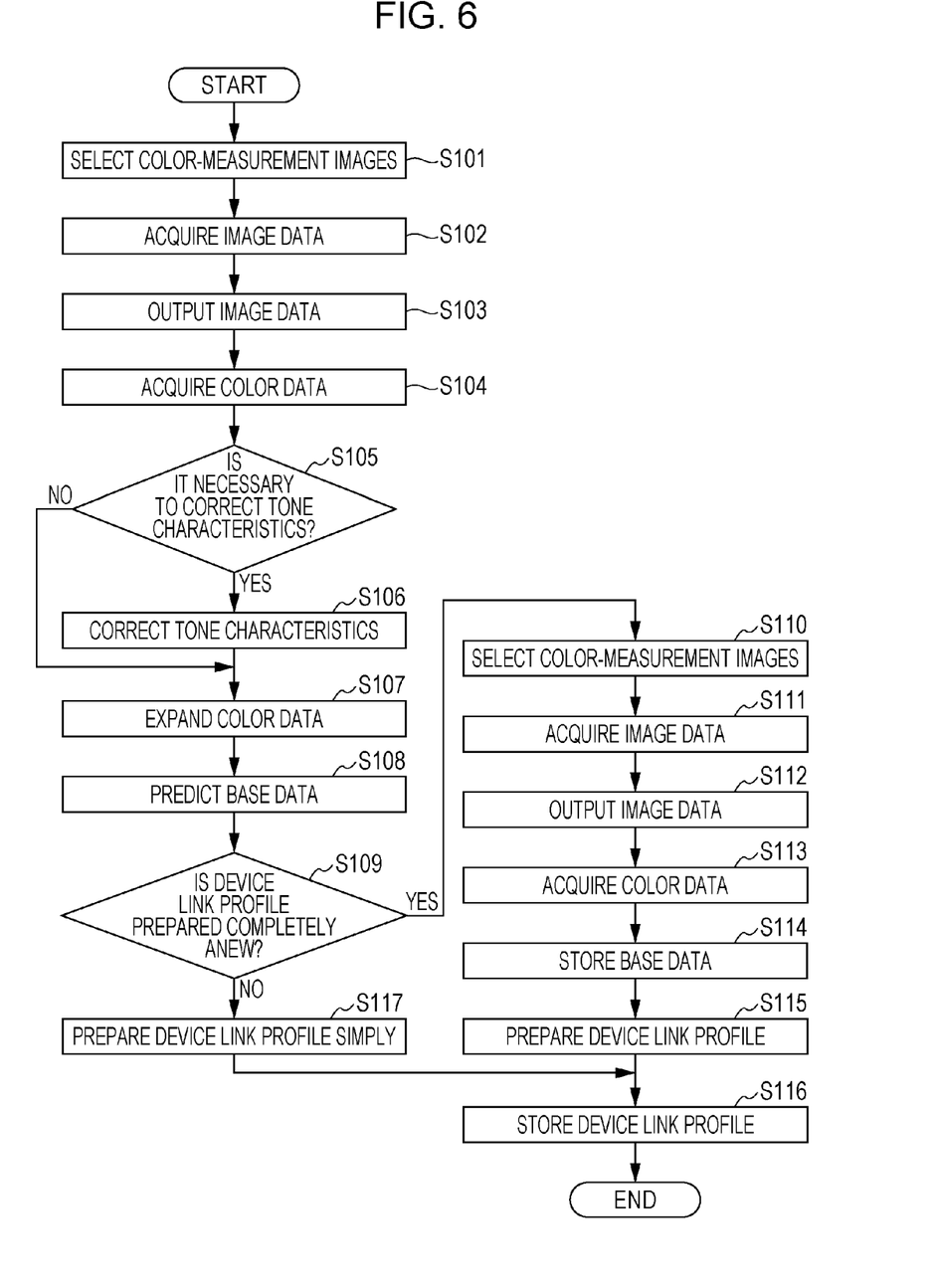
FIG. 6 is a flowchart illustrating operation of the color processing section.

FIG. 6 is a flowchart illustrating operation of the color processing section 26.

Operation of the color processing section 26 will be described below with reference to FIGS. 3 and 6.

First, the image selection section 261 selects color-measurement images for correcting the tone characteristics and a small set of color-measurement images (step S101). The number of color-measurement images is 200, for example.

Then, the image selection section 261 acquires image data for the color-measurement images from the image data storage section 262 (step S102).

Next, the image data output section 263 outputs the acquired image data for the color-measurement images to the image forming unit 3 (step S103). The image data output at this time include the image data for the color-measurement images for correcting the tone characteristics, and the image data for the small set of color-measurement images.

Hence, the image data output section 263 may be considered as an output section that outputs to the image forming unit 3 the second color information in the first color space (the YMCK data in the YMCK color space for the small set), which has been reduced in number from the first color information used for the second association information (the YMCK data used for the base data).

The output image data are subjected to a color conversion performed by the color adjustment section 25 (see FIG. 2), and printed on the paper P as color-measurement images by the image forming unit 3. Then, the printed color-measurement images are read by the color measurement unit. The resulting color data acquired for the color-measurement images are acquired by the color data acquisition section 264 (step S104). Among the color data acquired by the color data acquisition section 264, color data for the small set of color-measurement images are defined as third output color information. As discussed earlier, the color data correspond to the L*a*b* data. Besides, color data for the color-measurement images for correcting the tone characteristics are also acquired.

Hence, the color data acquisition section 264 may be considered as an output color information acquisition section that acquires the third output color information in the second color space (the L*a*b* data in the L*a*b* color space) output from the image forming unit 3 when the second color information (the YMCK data for the small set) is input to the image forming unit 3.

Next, the tone correction decision section 265 decides whether or not to correct the tone characteristics on the basis of the color data for the color-measurement images for correcting the tone characteristics (step S105). The tone correction decision section 265 decides whether or not to correct the tone characteristics in accordance with the degree of deviation in tone characteristics as described in relation to FIG. 4.

Then, in the case where the tone correction decision section 265 decides to correct the tone characteristics (Yes in step S105), the tone characteristic correction section 266 corrects the tone characteristics for at least one of the YMCK colors (step S106).

In the case where the tone correction decision section 265 decides not to correct the tone characteristics (No in step S105), on the other hand, or after step S106, the processes in and after step S107 are performed.

The prediction section 269 predicts fourth output color information obtained by correlating the color data for the small set (third output color information) with the YMCK data of the target information (first color information). That is, an interpolation process or the like is performed on the color data for the small set to expand 200 correlation relationships (Y, M, C, K)–(L*, a*, b*), for example, to 1584 correlation relationships, the number of which is the same as that of the YMCK data of the target information (step S107). The L*a*b* data obtained by expanding the L*a*b* data as the color data for the small set (third output color information) are defined as fourth output color information.

When the color data for the small set (third output color information) are correlated with the YMCK data of the target information (first color information), a difference dL*a*b* (dL*, da*, db*) between the color data for the small set (third output color information) and the expanded L*a*b* data (fourth output color information) may exceed values determined in advance. In such a case, the prediction section 269 may perform a clipping process for keeping the difference dL*a*b* at the values determined in advance. That is, the clipping process is performed such that the expanded L*a*b* data fall within a range defined by the values determined in advance.

Figure 7:
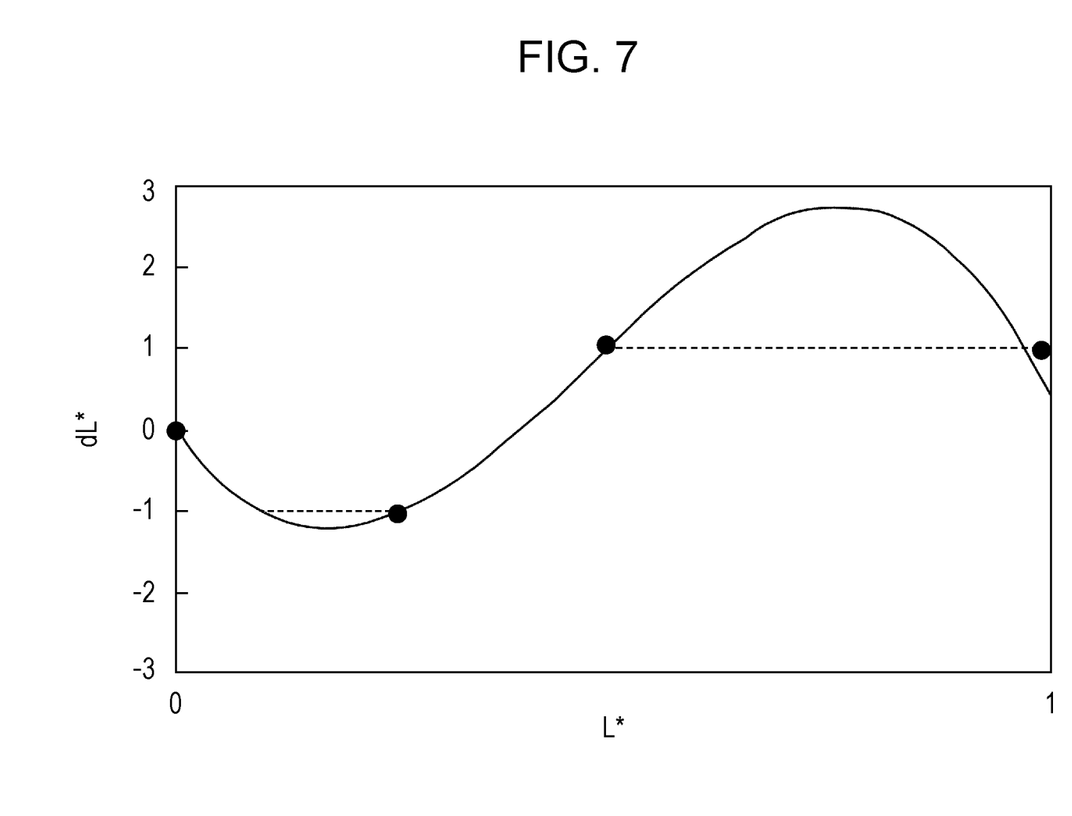
FIG. 7 illustrates the concept of a clipping process performed by a prediction section.

FIG. 7 illustrates the concept of a clipping process performed by the prediction section 269.

In FIG. 7, the horizontal axis represents the L* data among the color data for the small set, and the vertical axis represents the difference dL* between the expanded L* data and the L* data for the small set before being expanded. The black dots indicate the color data for the small set. The solid line is a line that connects the color data for the small set through polynomial approximation. The difference dL* after expansion is selected from points on the solid line. In order for dL* to take a value in the range of −1 to 1, the values determined in advance are set to −1 and 1, and in the case where one of the values is exceeded, the clipping process is performed to keep the difference dL* at −1 or 1 as indicated by the dotted lines.

In FIG. 7, the clipping process is performed with focus on the difference in L* data. However, the clipping process may be performed with focus on the difference in a* data or b* data. Further, the clipping process may be performed with focus on the difference in Euclidean distance in the L*a*b* color space.

Then, the prediction section 269 predicts the base data to be newly applied (second association information) on the basis of the expanded L*a*b* data (fourth output color information) by predicting the L*a*b* data of the base data (second output color information) (step S108). That is, data in (L*, a*, b*) in the correlation relationship (Y, M, C, K)–(L*, a*, b*) constituting the base data are replaced with the expanded L*a*b* data. Then, the resulting data are determined as the predicted base data to be newly applied. In this case, the YMCK data of the base data remain unchanged.

At this time, the prediction section 269 may predict base data to be newly applied (second association information) in consideration of the degree of deviation in tone characteristics in the case where the tone correction decision section 265 decides not to correct the tone characteristics in step S105. That is, in the case where there is deviation in tone characteristics as illustrated in FIG. 4A, the color data for the small set (third output color information) also include an error that matches the deviation. In the case where there is only slight deviation in tone characteristics as illustrated in FIG. 4B, the predicted color data (third output color information) may not include an error. Hence, the base data to be newly applied are prepared on the basis of the predicted color data.

Next, the determination section 270 determines whether to prepare the device link profile completely anew from the beginning, or to prepare the device link profile by a simple method (step S109). The determination may be made, for example, in accordance with the degree of a difference obtained by comparing the expanded L*a*b* data and the L*a*b* data (first output color information) as the target for the target information (first association information). For example, the two types of L*a*b* data are compared, and the device link profile is prepared anew in the case where the average color difference is three or more, and prepared by a simple method as discussed later in step S117 in the case where the average color difference is not three or more.

Then, in the case where the determination section 270 determines to prepare the device link profile completely anew from the beginning (Yes in step S109), the image selection section 261 selects the full set of color-measurement images (step S110).

Then, the image selection section 261 acquires image data for the full set of color-measurement images from the image data storage section 262 (step S111).

Next, the image data output section 263 outputs the acquired image data for the full set of color-measurement images to the image forming unit 3 (step S112).

Then, as in step S104, the color data acquisition section 264 acquires color data for the color-measurement images transmitted from the color measurement unit (step S113).

The correlation relationship between the image data for the full set of color-measurement images output from the image data output section 263 and the color data for the color-measurement images is stored in the association information storage section 268 as the base data (second association information) (step S114).

The conversion relationship preparation section 271 compares the base data (second association information) and the target information (first association information) to prepare the device link profile completely anew from the beginning (step S115). Specifically, the L*a*b* data of the base data and the L*a*b* data of the target information are compared to prepare correlation relationship between the YMCK data with matching L*a*b* data.

In the case where the color guarantee discussed earlier is performed at this time, the device link profile is prepared such that at least a part of the YMCK data of the target information (first color information) is not changed in order to perform a color guarantee. In the example discussed earlier, in order to perform a color guarantee for the Y color, the device link profile is prepared such that color data other than the Y-color data, namely the M-color data, the C-color data, and the K-color data, are held at 0 and not changed. Meanwhile, in order to perform a color guarantee for the process black color, the device link profile is prepared such that the K-color data are held and not changed.

In the manner described above, the device link profile for performing a color adjustment for the image forming unit 3 in the YMCK color space (in the first color space) may be prepared completely anew from the beginning.

The device link profile is stored in the conversion relationship storage section 272 (step S116).

In the case where the determination section 270 does not determine to prepare the device link profile completely anew from the beginning, but determines to prepare the device link profile by a simple method (No in step S109), on the other hand, the conversion relationship preparation section 271 prepares the device link profile anew on the basis of the base data (second association information) predicted by the prediction section 269 in step S108 and the target information (first association information) (step S117). In the case where the color guarantee is performed at this time, the device link profile is prepared such that at least a part of the YMCK data of the target information (first color information) is not changed in order to perform a color guarantee as described in relation to step S114.

In the manner described above, the device link profile for performing a color adjustment for the image forming unit 3 in the YMCK color space (in the first color space) may be prepared anew by a simple method.

The device link profile is stored in the conversion relationship storage section 272 (step S116).

With the color processing section 26 discussed in detail above, color data for the small set of color-measurement images, which is smaller in number than the full set of color-measurement images, are acquired. Then, the acquired color data are expanded, and the device link profile is prepared anew using the expanded color data to finely adjust the device link profile. This allows a reduction in number of color-measurement images, and makes it possible to prepare a device link profile corresponding to temporal variations of the color adjustment-subject unit or the like in a simple manner. Further, the base data to be newly applied are predicted by predicting the L*a*b* data of the base data, without changing lattice points of the device link profile (YMCK data of the device link profile) as discussed above.

With the color processing section 26 discussed in detail above, in addition, the determination section 270 determines whether to prepare the device link profile completely anew from the beginning, or to prepare the device link profile by a simple method. Consequently, the device link profile may be prepared anew by a simple method when a sufficiently high accuracy of the device link profile may be secured, and may be prepared completely anew from the beginning when a sufficiently high accuracy of the device link profile may not be secured.

Although the color adjustment-subject unit is the image forming unit 3 in the example discussed in detail above, the color adjustment-subject unit is not limited thereto, and may be a display such as a liquid crystal display. In this case, the first color space is an RGB color space, and the first color information and the second color information are RGB data. In addition, although the second color space is the L*a*b* color space in the example described above, the second color space is not limited thereto. It is desirable that the second color space should be a device-independent color space.

Figure 8:
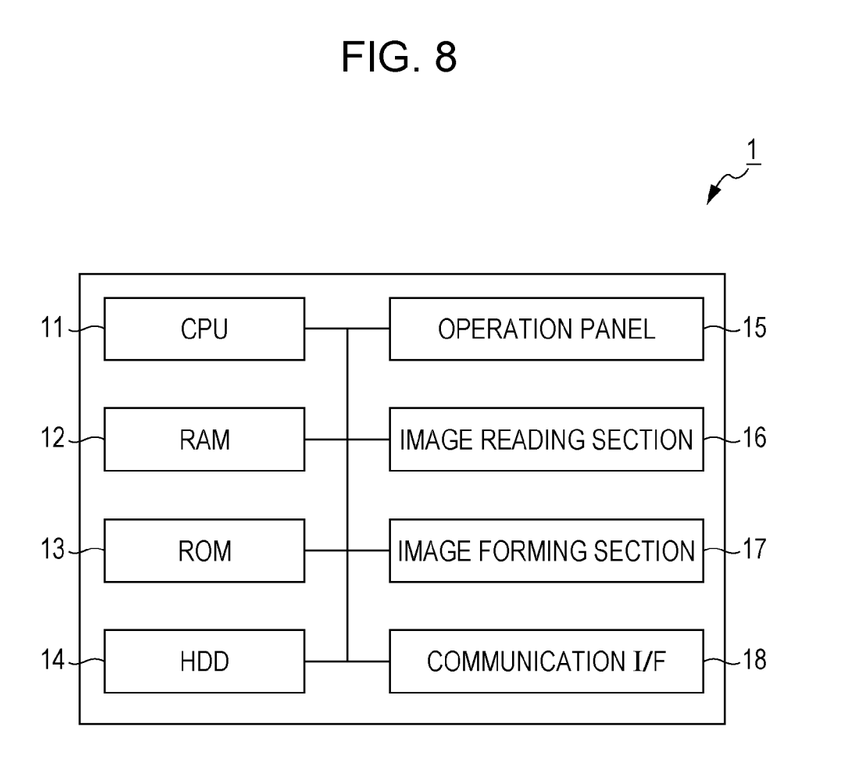
FIG. 8 illustrates an example of the hardware configuration of the image forming apparatus.

FIG. 8 illustrates an example of the hardware configuration of the image forming apparatus 1.

As illustrated in the drawing, the image forming apparatus 1 includes a CPU 11, a random access memory (RAM) 12, a read only memory (ROM) 13, a hard disk drive (HDD) 14, an operation panel 15, an image reading section 16, an image forming section 17, and a communication interface (hereinafter referred to as "communication I/F") 18.

The CPU 11 loads various types of programs stored in the ROM 13 etc. into the RAM 12 and executes the programs to implement various functions of the image forming apparatus 1.

The RAM 12 is a memory used as a working memory for the CPU 11, for example.

The ROM 13 is a memory that stores the various types of programs etc. to be executed by the CPU 11.

The HDD 14 is a magnetic disk device, for example, that stores image data read by the image reading section 16, image data for use in image formation performed by the image forming section 17, etc.

The operation panel 15 is a touch panel, for example, that displays various information and that receives an operation input from the user.

The image reading section 16 reads an image recorded on a storage medium such as paper. The image reading section 16 may be a scanner, for example, and may be of a CCD type in which light radiated from a light source and reflected by an original copy is contracted using a lens to be received by charge coupled devices (CCD), or a CIS type in which light sequentially radiated from a light emitting diode (LED) light source and reflected by an original copy is received by a contact image sensor (CIS).

The image forming section 17 forms an image on the paper P. The image forming section 17 may be the same as the image forming unit 3 in FIG. 1.

The communication I/F 18 exchanges various information with other devices via the network N.

<Program>

The process performed by the color processing section 26 according to the exemplary embodiment described above may be implemented through cooperation between software and hardware resources. For example, the CPU 11 in the image forming apparatus 1 loads a program for implementing the functions of the color processing section 26 from the ROM 13 into the RAM 12 to execute the program.

Hence, the process performed by the color processing section 26 may be considered as a program including: acquiring first association information (target information) obtained by associating first color information in a first color space (YMCK data in the YMCK color space) and first output color information as a target to be output in a second color space (L*a*b* data in the L*a*b* color space) when the first color information is input to the color adjustment-subject unit (image forming unit 3) which is subjected to a color adjustment for an image, and second association information (base data) obtained by associating the first color information and second output color information in the second color space (L*a*b* data in the L*a*b* color space) for an image output when the first color information is input to the color adjustment-subject unit; outputting second color information in the first color space (YMCK data in the YMCK color space), which has been reduced in number compared to the first color information used for the second association information, to the color adjustment-subject unit; acquiring third output color information in the second color space (L*a*b* data in the L*a*b* color space) output from the color adjustment-subject unit when the second color information is input to the color adjustment-subject unit; predicting the second association information to be newly applied on the basis of the third output color information by predicting the second output color information; and preparing a conversion relationship (device link profile) for performing a color adjustment on the color adjustment-subject unit in the first color space on the basis of the predicted second association information and the first association information.

The programs for implementing the exemplary embodiment may be not only provided by a communication unit but also provided as stored in a recording medium such as a CD-ROM.

While an exemplary embodiment of the present invention has been described above, the technical scope of the present invention is not limited to the exemplary embodiment described above. It is apparent from the following claims that a variety of modifications and improvements that may be made to the exemplary embodiment described above also fall within the technical scope of the present invention.

What is claimed is:

1. A color processing device comprising:
an association information acquisition section that acquires first association information obtained by associating first color information in a first color space and first output color information as a target to be output in a second color space when the first color information is input to a color adjustment-subject unit which is subjected to a color adjustment for an image, and second association information obtained by associating the first color information and second output color information in the second color space for an image output when the first color information is input to the color adjustment-subject unit;
an output section that outputs second color information in the first color space, which has been reduced in number compared to the first color information used for the second association information, to the color adjustment-subject unit;
an output color information acquisition section that acquires third output color information in the second color space output from the color adjustment-subject unit when the second color information is input to the color adjustment-subject unit;
a prediction section that predicts the second association information to be newly applied on the basis of the third output color information by predicting the second output color information; and
a conversion relationship preparation section that prepares a conversion relationship for performing a color adjustment on the color adjustment-subject unit in the first color space on the basis of the predicted second association information and the first association information.

2. The color processing device according to claim 1, wherein the conversion relationship preparation section prepares the conversion relationship such that at least a part of the first color information is not changed in order to perform a color guarantee.

3. The color processing device according to claim 1, wherein the prediction section predicts the second association information to be newly applied using fourth output color information obtained by correlating the third output color information with the first color information.

4. The color processing device according to claim 3, wherein if a difference between the third output color information and the fourth output color information exceeds a value determined in advance when the third output color information is correlated with the first color information, a clipping process is performed to keep the difference at the value determined in advance.

5. The color processing device according to claim 1, further comprising:
a determination section that determines whether or not to prepare the conversion relationship anew on the basis of the third output color information.

6. An image forming apparatus comprising:
an image forming unit that forms an image on a recording material using a plurality of color materials;
a color adjustment unit that performs a color adjustment for the image formed by the image forming unit; and
a conversion relationship preparation unit that prepares a conversion relationship used for the color adjustment unit to perform the color adjustment,
wherein the conversion relationship preparation unit includes
an association information acquisition section that acquires first association information obtained by associating first color information in a first color space constituted by colors of the color materials and first output color information as a target to be output in a second color space when the first color information is input to the image forming unit, and second association information obtained by associating the first color information and second output color information in the second color space output when the first color information is input to the image forming unit;
an output section that outputs second color information in the first color space, which has been reduced in number compared to the first color information used for the second association information, to the image forming unit;
an output color information acquisition section that acquires third output color information in the second color space for the image output from the image forming unit when the second color information is input to the image forming unit;
a prediction section that predicts the second association information to be newly applied on the basis of the third output color information by predicting the second output color information; and a conversion relationship preparation section that prepares the conversion relationship for performing a color adjustment in the first color space on the basis of the predicted second association information and the first association information.

7. The image forming apparatus according to claim 6, wherein the conversion relationship preparation unit further includes
a tone characteristic correction section that corrects tone characteristics for each of the color materials of the image forming unit, and
a correction decision section that decides whether or not the tone characteristic correction section corrects the tone characteristics in accordance with a degree of deviation in tone characteristics,
the tone correction decision section decides to correct the tone characteristics in the case where the degree of deviation in tone characteristics exceeds a range determined in advance, and decides not to correct the tone characteristics in the case where the degree of deviation in tone characteristics falls within the range determined in advance, and
the prediction section predicts the second association information to be newly applied in consideration of the degree of deviation in tone characteristics in the case where the correction decision section decides not to correct the tone characteristics.

8. A non-transitory computer readable medium storing a program causing a computer to execute a process comprising:
acquiring first association information obtained by associating first color information in a first color space and first output color information as a target to be output in a second color space when the first color information is input to a color adjustment-subject unit which is subjected to a color adjustment for an image, and second association information obtained by associating the first color information and second output color information in the second color space for an image output when the first color information is input to the color adjustment-subject unit;
outputting second color information in the first color space, which has been reduced in number compared to the first color information used for the second association information, to the color adjustment-subject unit;
acquiring third output color information in the second color space output from the color adjustment-subject unit when the second color information is input to the color adjustment-subject unit;
predicting the second association information to be newly applied on the basis of the third output color information by predicting the second output color information; and
preparing a conversion relationship for performing a color adjustment on the color adjustment-subject unit in the first color space on the basis of the predicted second association information and the first association information.

* * * * *